United States Patent
Kitamoto et al.

(10) Patent No.: US 6,499,577 B2
(45) Date of Patent: Dec. 31, 2002

(54) VALVE APPARATUS FOR CONTROLLING HYDRAULIC PRESSURE FOR A CLUTCH OR A BRAKE AND METHOD FOR CONTROLLING HYDRAULIC PRESSURE

(75) Inventors: Hiroaki Kitamoto, Komatsu (JP); Kaoru Hasegawa, Tatsunokuchi-machi (JP); Kenjiro Shimada, Komatsu (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/863,277

(22) Filed: May 24, 2001

(65) Prior Publication Data

US 2002/0008425 A1 Jan. 24, 2002

(30) Foreign Application Priority Data

Jun. 1, 2000 (JP) ........................................ 2000-164494

(51) Int. Cl.[7] .............................................. F16D 25/14
(52) U.S. Cl. ................................. 192/85 R; 192/109 F
(58) Field of Search ............................ 192/85 R, 87.1, 192/87.11, 109 F; 137/486, 625.65; 91/433

(56) References Cited

U.S. PATENT DOCUMENTS 5,035,312 A 7/1991 Asayama et al.
5,168,973 A 12/1992 Asayama et al.

FOREIGN PATENT DOCUMENTS

JP 63-235732 9/1988

*Primary Examiner*—Christopher P. Schwartz
(74) *Attorney, Agent, or Firm*—Wenderoth, Lind & Ponack, L.L.P.

(57) ABSTRACT

Hydraulic pressure is controlled, which has such advantages that a generation of peak pressure (shoot pressure) can be lowered, mis-operation due to biting of particles can be reduced, or the cost thereof can be reduced. First, a large amount inflow command current is supplied to a proportional solenoid from a time point t1 to a time point t2. Consequentially, pilot pressure rises in a pilot pressure receiving chamber, so that a pressure control valve allows a large amount of hydraulic fluid to flow in a clutch or brake cylinder. At this time, potential detected by a pressure switch becomes zero level. Next, at the time point t2, a filling command small current is supplied to the proportional solenoid, thereby decreasing the amount of hydraulic fluid, which flows from an input port to an output port. This state is maintained from the time point t2 to a time point t3. At the termination of filling, peak pressure will not be generated, and a speed-changing shock in a clutch will not be generated, so that smooth switching can be accomplished.

7 Claims, 11 Drawing Sheets

FIG.5A
PRESS FORCE OF THE PROPORTIONAL SOLENOID
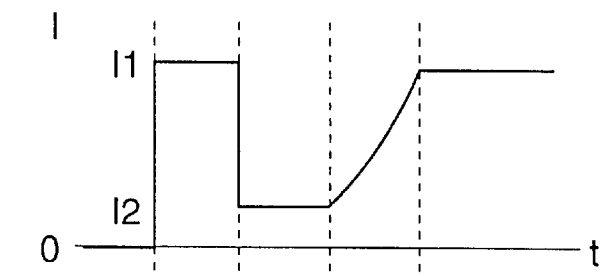
FIG.5B
PRESSURE IN THE PILOT CHAMBER
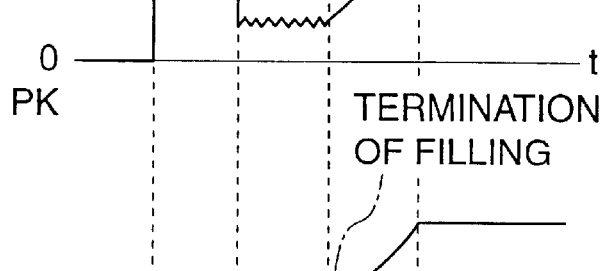
FIG.5C
CLUCH PRESSURE
TERMINATION OF FILLING
FIG.5D
POTENTIAL DETECTED BY THE PRESSURE SWITCH
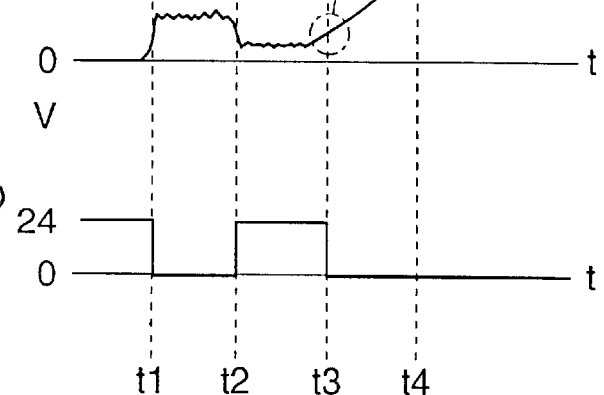

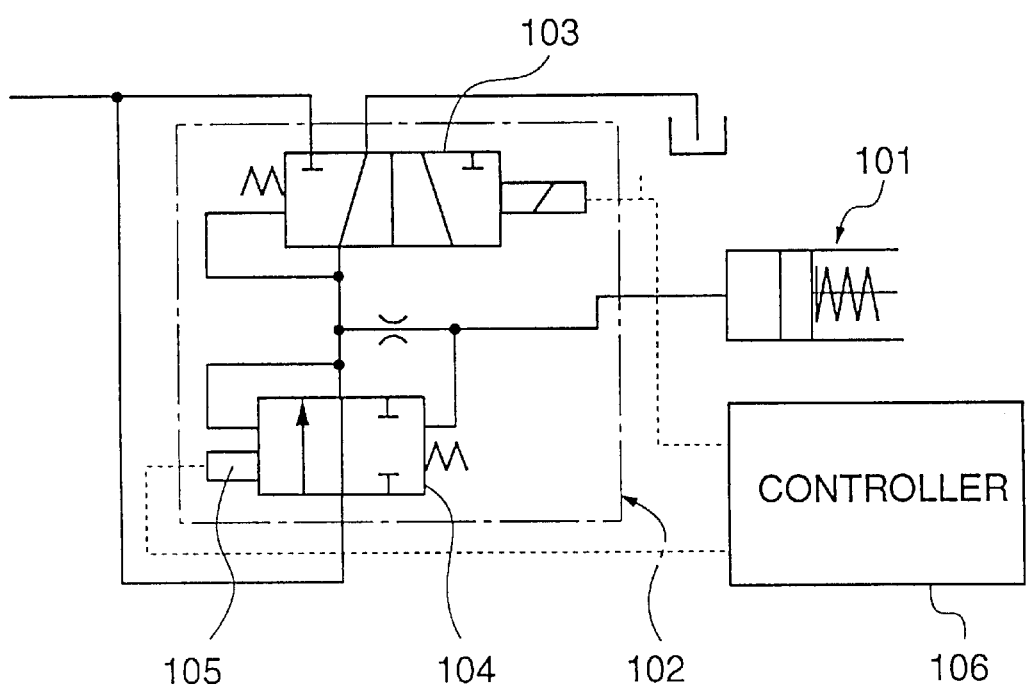
*FIG.9* (CONVENTIONAL)

COMMAND CURRENT

PUMP PRESSURE

PRESSURE OF THE
OUTPUT PORT OF
THE VALVE

CLUCH PRESSURE

OUTPUT OF THE SENSOR
(POTENTIAL AT
THE POINT "a")

VALVE APPARATUS FOR CONTROLLING HYDRAULIC PRESSURE FOR A CLUTCH OR A BRAKE AND METHOD FOR CONTROLLING HYDRAULIC PRESSURE

TECHNICAL FIELD

The present invention relates to a valve apparatus for controlling hydraulic pressure of a hydraulic pressure operated actuator usable for a clutch or a brake, and a method for controlling hydraulic pressure.

BACKGROUND ART

A hydraulic pressure control apparatus applicable for a clutch, disclosed in Japanese Laid-Open Patent publication No. 235732/1988, will be explained as an example of prior arts.

FIG. 9 shows a clutch cylinder 101 and a control valve 102 for controlling the clutch cylinder 101 in the above prior art. The control valve 102 includes a pressure control valve 103 for controlling clutch hydraulic pressure, and a flow rate detection valve 104. The flow rate detection valve 104 is provided with a sensor section 105 for detecting filling and clutch pressure level. The pressure control valve 103, the flow rate detection valve 104 and the sensor section 105 are stored in an integrated housing (107 as shown in FIG. 10). The pressure control valve 103 and the sensor section 105 are electrically connected to a controller 106.

As shown in FIG. 10, the control valve 102 includes an input port 110, an output port 111 and drain ports 113 and 114. To the input port 110 of the control valve 102, a hydraulic fluid supply line delivered from a pump (not shown) is connected. And, to the tip of the output port 111, the clutch cylinder 101 (as shown in FIG. 9) is connected.

The pressure control valve 103 has a spool 115, the right end of which comes in contact with a plunger 117 of a proportional solenoid. In the left end of the spool 115, a piston 119 is installed and a spring 118 comes into contact with the spool 115. In the spool 115, a hydraulic chamber 120 close to the piston 119 and a hydraulic passage 121 communicated with the hydraulic chamber 120 are formed. Hydraulic pressure in the hydraulic passage 122 is applied, as a feedback pressure, to the hydraulic chamber 120 via a hydraulic passage 121.

The flow rate detection valve 104 has a spool 125, which defines hydraulic chambers 126, 127 and 128 in the housing 107. An orifice 130 is formed between the hydraulic chambers 127 and 128. Springs 131 and 132 abut on the left and right ends of the spool 125, respectively. The spool 125 is positioned at the neutral position as shown in FIG. 10 under a resilient force of the springs 131 and 132 when pressure dose not rise in the hydraulic chambers 127 and 128. When the piston 125 is at the neutral position, the hydraulic fluid, which has reached from the input port 110 to the flow rate detection valve 104 via the hydraulic passage 129, remains in the hydraulic chamber 126.

A detection pin 134 made of metal is disposed on the upper right side of the flow rate detection valve 104. The pin 134 detects that the spool 125 is displaced in the rightward direction from the neutral position, as shown in FIG. 10, overcoming a resilient force of the spring 132. The detecting pin 134 is mounted to the housing 107 by a cover 135 via an isolation sheet 136. From the end of the detecting pin 134, a lead wire 137 is extended, which is connected to a point "a" located between resistances R1 and R2 which are connected to each other in series. Between the resistances R1 and R2, a predetermined magnitude of DC voltage V (for instance, 12 V) is applied. The end of the resistance R2 and the housing 107 are grounded respectively. The sensor section 105 comprises these spring 132, detecting pin 134, and resistances R1 and R2.

Next, operation of the hydraulic pressure control apparatus for a clutch having the above-mentioned structure will be explained referring to FIG. 9 to FIG. 11.

The horizontal axis shows a time t in FIG. 11(A) to FIG. 11(E). The vertical axis of FIG. 11(A) shows current I commanded from the controller 106, the vertical axis of FIG. 11(B) shows a pump pressure P0, the vertical axis of FIG. 11(C) shows hydraulic pressure (clutch pressure) P1 in the hydraulic chamber 127 in the front of the orifice 130, the vertical axis of FIG. 11(D) shows hydraulic pressure (clutch pressure) P2 in the hydraulic chamber 128 in the back of the orifice 130, and the vertical axis of FIG. 11(E) shows a output S (a voltage at a point "a") of the sensor section 105.

When a clutch is connected, at a time point t1 in FIG. 11, the controller 106 operates so that trigger command current I1 is supplied to the proportional solenoid 116 of the control valve 102. Thereafter, the controller 106 operates so that the trigger command current I1 is lowered to an initial pressure command current I0 and this condition is maintained until the termination of filling. The initial pressure command current I0 corresponds to an initial pressure Pa (as shown in FIG. 11(D)) of the clutch pressure.

By supplying the trigger command current I1, the spool 115 of the pressure control valve 103 is displaced in the leftward direction so that the input port 110 is communicated with the hydraulic passage 122. Consequentially, the hydraulic fluid delivered from the pump is introduced from the input port 110 into the hydraulic chamber 127 of the flow rate detecting valve 104 via the hydraulic passage 122, and then into the hydraulic chamber 128 via the orifice 130. At this moment, differential pressure (P1–P2) is generated between the hydraulic chambers 127 and 128 due to the existence of the orifice 130. The differential pressure causes the spool 125 to be displaced in the leftward direction, so that the flow rate detecting valve 104 is opened. Therefore, the hydraulic fluid flows from the input port 110 into the hydraulic chamber 127 via the hydraulic passage 129 and the hydraulic chamber 126, and then into the clutch via the orifice 130, the hydraulic chamber 128 and the output port 111. The hydraulic fluid continues to flow until a clutch-back becomes completely filled.

Here, when the spool 125 is positioned at the neutral position in FIG. 10, and, during a period in which the spool 125 is being displaced in the leftward direction from the neutral position, the spool 125 is parted away from the detecting pin 134. Accordingly, the potential at the point "a" is a voltage V', which is obtained by dividing the voltage V by the resistances R1 and R2, as shown in FIG. 11(E).

When the clutch-back is completely filled with the hydraulic fluid, the filling is terminated. At this time, since the hydraulic fluid stops flowing, there is no difference in pressures at the front and back of the orifice 130 (that is, P1=P2). At this moment, the spool 125 is displaced in the rightward direction by the spring 131 and a difference in the pressure receiving areas of the spool 125 result in the detecting pin 134, once conducted to the housing 107, being grounded via the spool 125. The conduction is effected by displacement of the spool 125 due to shoot pressure generated at the termination of filling. And, the spool 125 returns to the neutral position in FIG. 10 when the shoot pressure disappears. Accordingly, as shown in FIG. 11(E), the potential at the point "a" is lowered to zero at a time point t2, and rises to V' again. A detecting signal S showing the potential at the point "a" is inputted to the controller 106, which determines the termination of filling from the potential rising at point "a". At the termination of filling, the controller 106 operates so that the command current I for the clutch cylinder 101 is gradually increased from the initial pressure command current 10 (as shown in FIG. 11(A)). Incidentally, the controller 106 operates so that the command current for a pre-stage clutch is lowered to zero at the determination of the termination of filling, as shown FIG. 11(A) with a dashed line.

As the result, the clutch pressure is lowered from the shoot pressure to the initial pressure Pa and then gradually increased as shown in FIG. 11(D). Accordingly, the spool 125 is displaced in the leftward direction from the neutral position. Thereafter, when the clutch pressure is gradually increased further to exceed a set pressure Th of the spring 132 at a certain time point t3, the spool 125 is displaced in the rightward direction again with the result that the right end of the spool 15 comes in contact with the detecting pin 134. Therefore, at the time point t3, the potential at the point "a" is lowered to zero again, and thereafter maintained at that level.

So, the potential at the point "a" becomes zero when the pressure in the clutch is higher than the set pressure Th, while the potential becomes a predetermined voltage when the pressure in the clutch is less than the set pressure. Accordingly, by monitoring the potential at the point "a", it is possible to know the presence or absence of the clutch pressure (that is, the engagement state of the clutch). And, in this case, since the potential at the point "a" rises after once being lowered to zero, due to the shoot pressure generated at the termination of filling, it is possible to know the termination of filling by detecting the first rising of the shoot pressure.

However, the above-mentioned hydraulic pressure control apparatus for a clutch has following problems.

(1) Response of the flow rate detecting valve 104 is inferior. So, as shown in FIG. 11(D), at the termination of filling, considerable shoot pressure is generated, which may cause speed changing shock.

(2) The pressure control valve 103 is directly driven by thrust of the plunger 117 of the proportional solenoid 116. Thus, if the capacity of the solenoid 116 is small, the thrust may be small, whereby a mis-operation of the pressure control valve 103 may easily occur due to biting of particles in the pressure fluid. On the other hand, when a strong solenoid is employed, the sufficient thrust can be obtained, but causes an increase in cost.

SUMMARY OF THE INVENTION

In view of the above-mentioned problems, the object of the present invention is to provide a valve apparatus and a method for controlling hydraulic pressure of an actuator applicable for a clutch or brake, which has such advantages that a generation of peak pressure (shoot pressure) can be lowered, mis-operation due to biting of particles can be reduced, or the cost thereof can be reduced.

To solve the above-mentioned problems, the present invention provides a valve apparatus for controlling hydraulic pressure for a clutch or a brake comprising a pressure control valve (30) has a clutch or brake cylinder inner pressure feedback chamber (31x) at one end thereof and a pilot pressure receiving chamber (31y) at another end thereof. The pressure control valve introduces a clutch or brake engagement pressure hydraulic fluid, which has been brought to flow into a clutch or brake cylinder chamber, into the above-mentioned clutch or brake cylinder inner pressure feedback chamber (31x), and increasing the hydraulic fluid pressure of the clutch or brake engagement pressure hydraulic fluid to balance with a magnitude of pilot pressure that is generated in the pilot pressure receiving chamber (31y), so that the pressure control valve (30) controls the clutch or brake cylinder pressure. The valve apparatus also comprises a pilot fluid passage (19), through which the hydraulic fluid flows from a branched passage (18) having a throttle (26a) to the pilot pressure receiving chamber (31y) of the above-mentioned pressure control valve (30) and drains it into a tank. The valve apparatus further comprises a pressure proportional valve (50) which controls the pressure of the pilot fluid that has flowed into the above-mentioned pilot pressure receiving chamber (31y) by positioning a valve element (55) thereof at either position within a drain interruption position, a throttle drain position or a drain release position; a proportional solenoid (40), which changes the position of the valve element (55) of the above-mentioned pressure proportional valve (50) against the flowing of the pilot fluid, and controls the magnitude of the pilot fluid pressure. The valve apparatus also comprises and a pressure switch (60), which communicates with a output port (13) of the above-mentioned pressure control valve (30) and detects the clutch or brake initial engagement pressure when the clutch or brake cylinder hydraulic chamber will be filled with the hydraulic fluid.

Since the conventional flow rate detecting valve, which is relatively inferior in response, is eliminated, the peak pressure (the shoot pressure) at filling completion will not be generated. In addition, it is possible to reduce costs. In addition, since the control is carried out by the pilot pressure, even if the proportional solenoid has small capability, the opening size of the main passage formed at the main valve is large, whereby a large amount of hydraulic fluid can flow and an operation defect of the main valve due to biting of particles will be prevented.

In one aspect of the valve apparatus for controlling hydraulic pressure for a clutch or a brake according to the present invention, it is preferable that the pressure switch operates when the clutch or brake cylinder hydraulic chamber is filled with the hydraulic fluid, thereby rising the clutch or brake initial engagement hydraulic fluid pressure therein, and the pressure switch does not operate when the pressure in the clutch or brake cylinder hydraulic chamber is less than the initial engagement pressure.

In one aspect of the valve apparatus for controlling hydraulic pressure for a clutch or a brake according to the present invention, it is preferable that a filtering means h is provided upstream of the throttle (26a) mounted at the pilot fluid passage (19). In this aspect, particles can be removed by the filter thereby preventing the throttle passage from being blocked.

In addition, in one aspect of the valve apparatus for controlling hydraulic pressure for a clutch or a brake according to the present invention, it is preferable that a second filtering means (230) is provided outside of a casing upstream of the above-mentioned filtering means. In this aspect, replacement and cleaning of the filter can be easily carried out.

The method for controlling hydraulic pressure of the hydraulic fluid control valve, which employs the valve apparatus for controlling hydraulic fluid discussed above connected to a controller, comprises the following five steps.

The first step is for flowing a large amount of hydraulic fluid into the clutch or brake cylinder hydraulic fluid chamber just before the chamber is filled with it. In the step, a clutch or brake engagement start command is inputted to a controller, which operates to output a large amount inflow command current to the proportional solenoid of the hydraulic fluid pressure control valve for a predetermined period. As the result, the drain of the pilot fluid drained from the pressure proportional valve to a tank is interrupted and the pilot fluid pressure in the pilot pressure receiving chamber is increased to a high level, so that a communicating port between the input port and the output port of the pressure control. valve becomes large.

The second step is for flowing a small amount of hydraulic fluid into the clutch or brake cylinder hydraulic fluid chamber until the chamber is filled with it. In the step, after the predetermined period in which the large amount inflow command has been outputted, the controller operates to output a small amount inflow command current to the proportional solenoid of the hydraulic fluid pressure control valve. As the result, the pilot fluid is drained from the pressure proportional valve to a tank through a throttle and the pilot fluid pressure in the pilot pressure receiving chamber is lowered, so that the communicating port between the input port and the output port of the pressure control valve becomes small.

The third step is for detecting the termination of filling. In the step, when the clutch or brake cylinder hydraulic fluid chamber has been filled with the hydraulic fluid and the clutch or brake initial engagement pressure rises, the pressure sensor provided at the hydraulic fluid pressure control valve detects the rising of the clutch or brake initial engagement pressure and outputs this information to the controller.

The fourth step is for gradually-increasing the clutch or brake cylinder initial engagement hydraulic fluid pressure. In the step, the controller, which has been inputted information regarding the termination of filling, operates to stop outputting the small amount inflow command current to the proportional solenoid of the hydraulic pressure control valve and then supplies a gradually-increasing command current to the solenoid for a predetermined period, so that the clutch or brake initial engagement hydraulic fluid pressure reaches a set pressure for the predetermined period. As the result, the opening size of the throttle, through which the pilot fluid is drained from the pressure proportional valve to the tank, is gradually decreased to allow the pilot fluid pressure in the pilot pressure receiving chamber to be gradually increased, and the pressure in the clutch or brake cylinder inner pressure feedback chamber of the pressure control valve to be increased to balance with the gradually-increased pilot fluid pressure.

The fifth step is for outputting the set pressure command signal to the proportional solenoid of the hydraulic fluid pressure control valve. In the step, after the predetermined period in which the clutch or brake initial engagement hydraulic fluid pressure is being increased, the controller operates to stop the hydraulic fluid pressure gradually-increasing command current, and to keep the clutch or brake engagement set pressure, in which the gradual-increase of the pressure has been finished.

BRIEF DESCRIPTION OF THE DRAWING

FIGS. 5(A) to (D) are timing charts showing an operation of the apparatus of FIG. 1.

FIG. 9 is a circuit diagram showing a hydraulic pressure circuit of a clutch hydraulic pressure control apparatus according to the conventional apparatus.

DETAILED DESCRIPTION OF THE INVENTION

Figure 1:
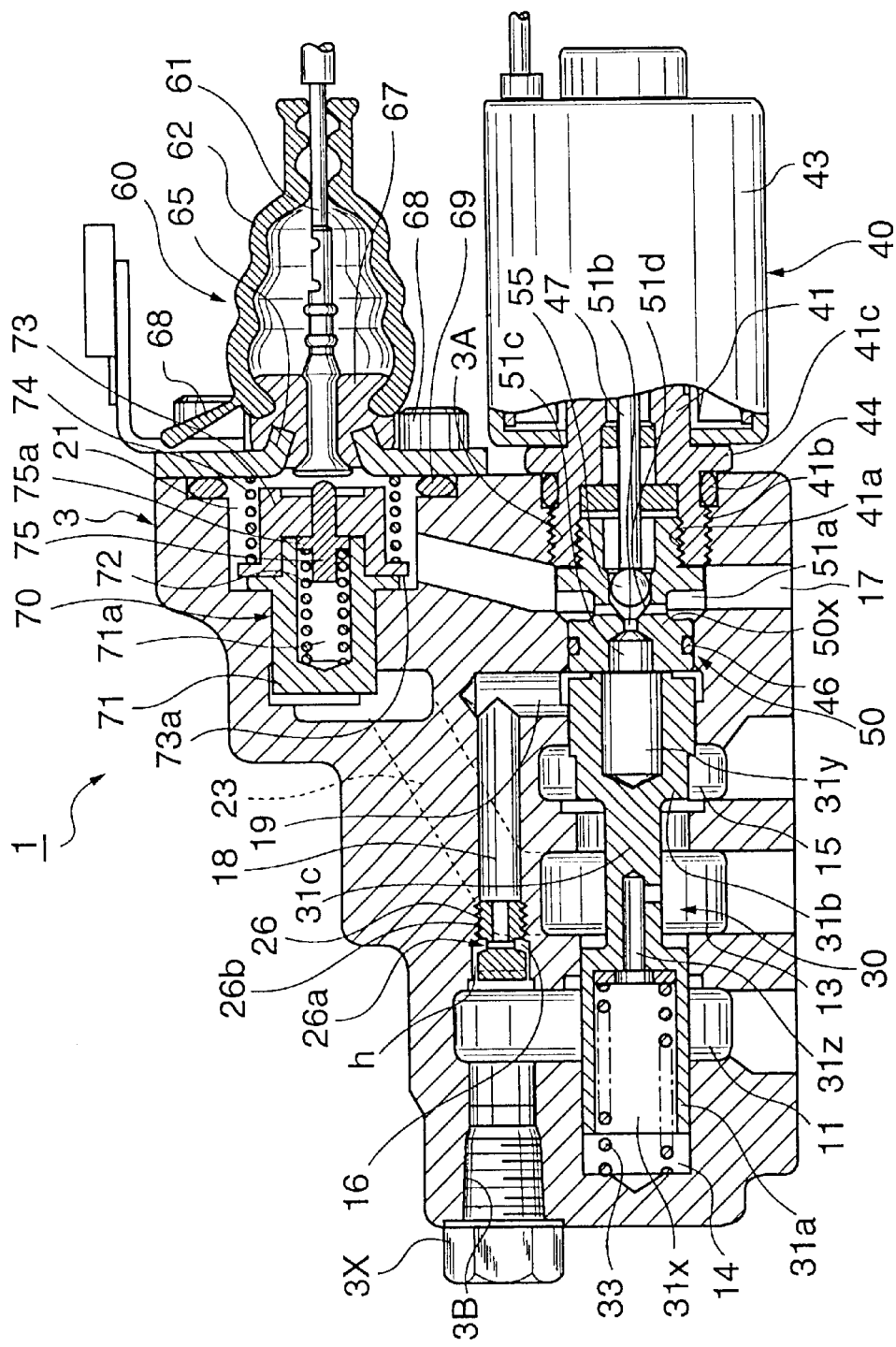
FIG. 1 is a sectional drawing showing a clutch hydraulic pressure control apparatus according to the first embodiment of the present invention at a drain state.

In the following, specific examples of the present invention will be explained referring to the drawings. Here, in the following explanation, the upper and lower, and the left and right mean the direction in the respective drawings.

{The First Embodiment}

Figure 2:
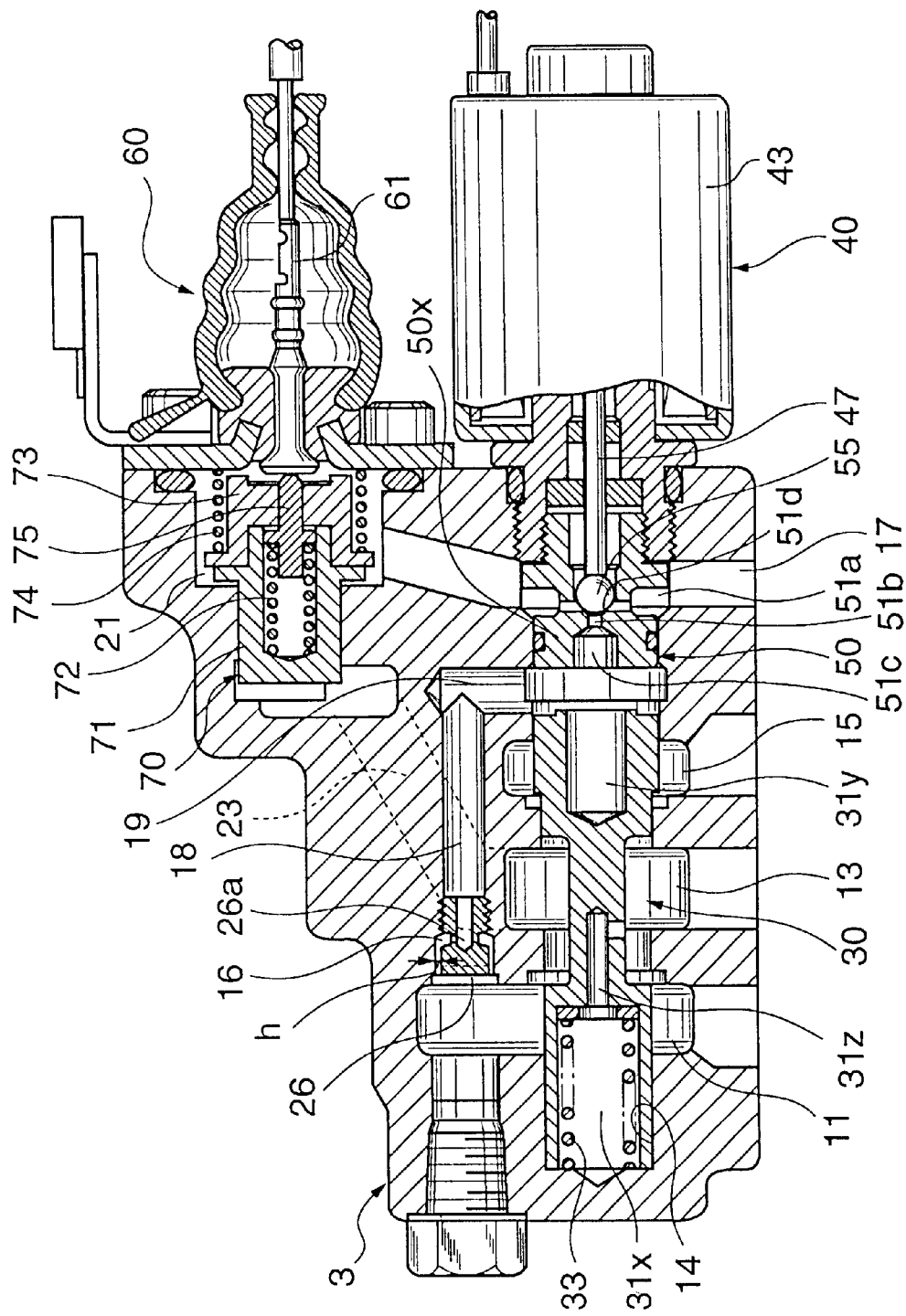
FIG. 2 is a sectional drawing showing the apparatus of FIG. 1 at an operating state.
Figure 3:
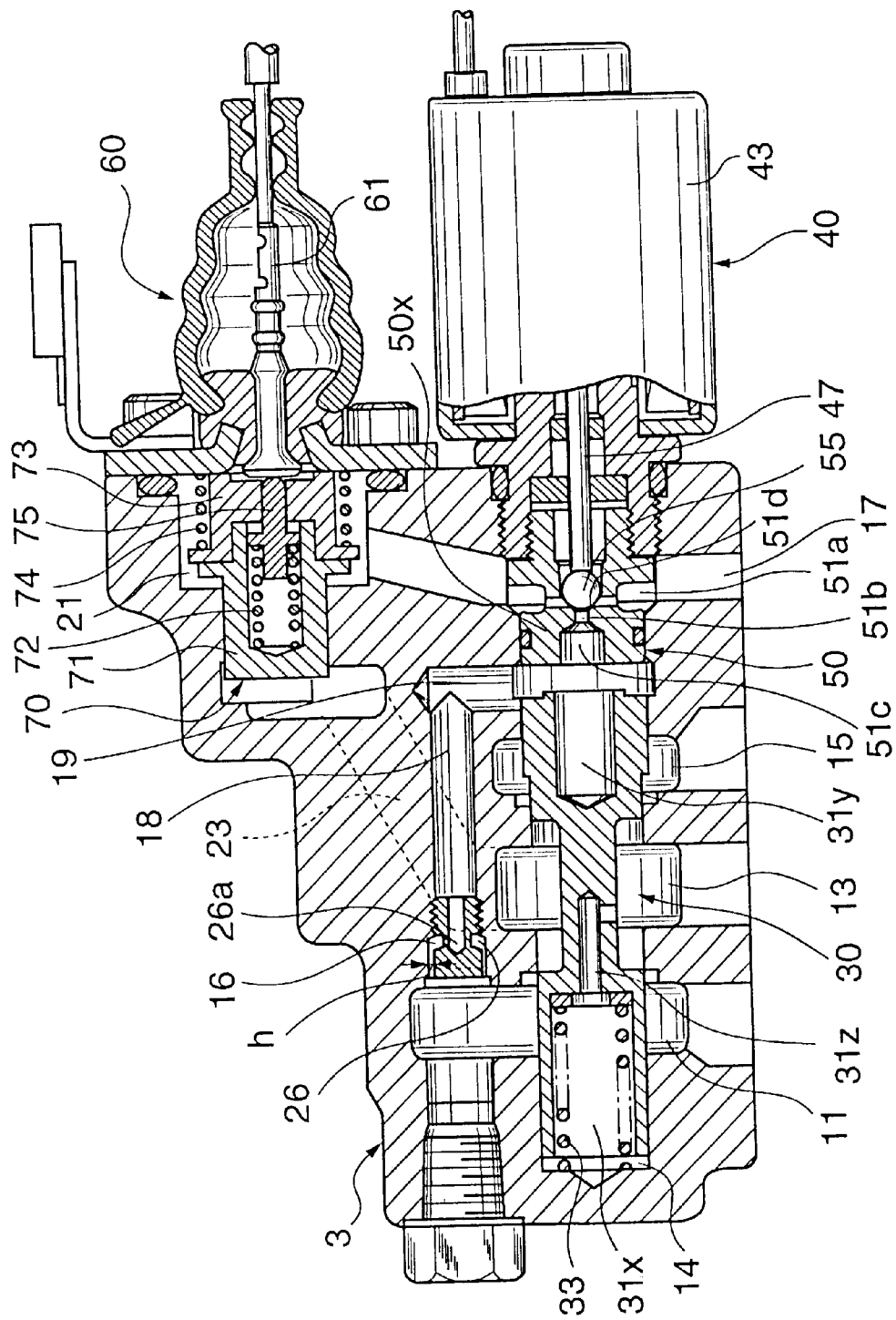
FIG. 3 is a sectional drawing showing the apparatus of FIG. 1 at a pressure adjusting state.
Figure 4:
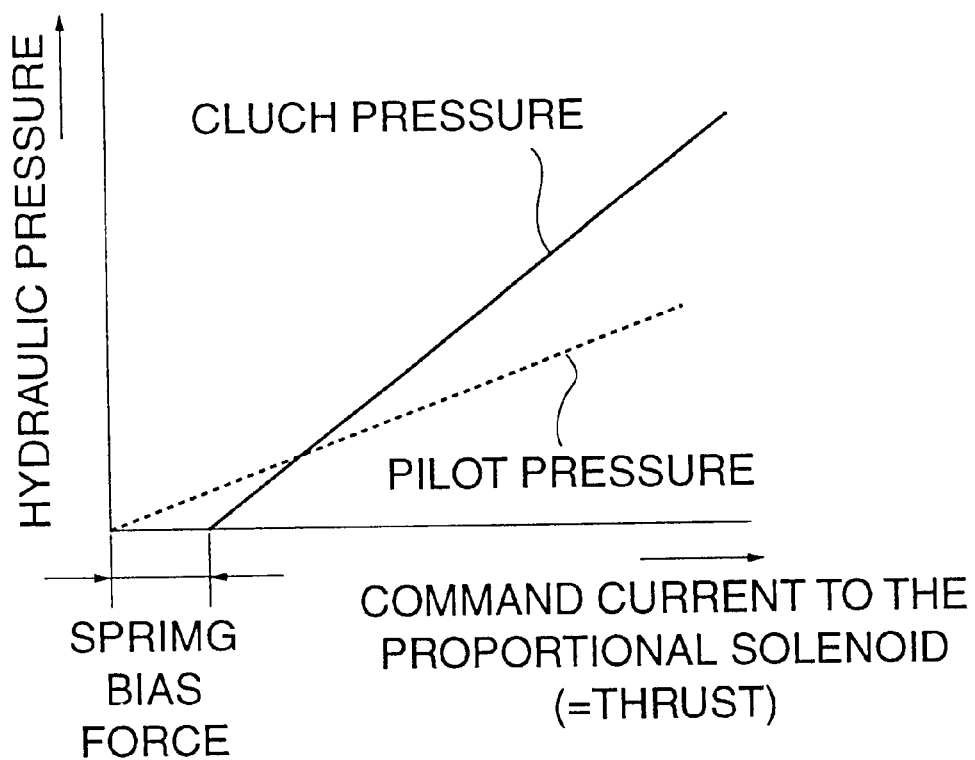
FIG. 4 is a graph between command current and, clutch pressure and pilot pressure, in the apparatus of FIG. 1.

As shown in FIGS. 1 to 3, a clutch hydraulic pressure control apparatus 1 according to the first embodiment of the invention has a housing 3, in which are provided an input port 11 communicated with a pump, an output port 13 communicated with a clutch cylinder, and drain ports 15 and 17 communicated with a tank. In addition, in the housing 3, a pilot pressure receiving chamber 19 is formed between the drain ports 15 and 17. The pilot pressure receiving chamber 19 and the input port 11 communicate with each other via a passage 16 and a pilot pressure supply passage 18. The input port 11 and the output port 13 define a main passage extended from the pump to the cylinder.

At the passage 16 between the input port 11 and the pilot pressure supply passage 18 is disposed a screw 26. At the right end of the screw 26, is formed a male screw 26b, which is screwed to an inner surface of the pilot pressure supply passage 18. Between the left end of the screw 26 and the inner wall of the passage 16, a clearance h. is defined. The clearance h acts as a filter for preventing a throttle passage 26a from being blocked. In the screw 26, the throttle passage (the first throttle passage) 26a is formed, which communicates the passage 16 with the pilot pressure supply passage 18. The screw 26 can be attached or detached through a screw bore 3B formed at the housing 3, thus enabling replacement and cleaning of the filter. Here, the screw bore 3B is generally closed by a plug 3X.

In the housing 3, a pressure control valve 30, a pressure proportional valve 50 and a proportional solenoid 40 are provided. The pressure control valve 30 is slidably disposed, and has a left end section 31a, a right end section 31b and a center section 31c between the end sections 31a and 31b. A feedback chamber 31X of clutch or brake inner pressure is formed at the left end section 31a, while a pilot pressure receiving chamber 31y is formed at the right end section 31b. At the center section 31c, a feedback passage 31z is formed, which communicates between the output port 13 with the clutch or brake inner pressure feedback chamber 31x. In the clutch or brake inner pressure feedback chamber 31x of the pressure control valve 30, a spring 33 is installed. At a closed state (the proportional solenoid 30 is not excited), as shown in FIG. 1, the spring 33 causes the pressure control valve 30 to be displaced in the rightward direction under the resilient force thereof, thereby interrupting the communication between the input port 11 and output port 13 and causing communication between the output port 13 and the drain port 17. As the result the hydraulic fluid does not flow into the clutch or brake and is drained from the clutch or brake, so that the clutch or brake is in a non-acting state.

At an acting state (the proportional solenoid 30 is excited), as shown in FIG. 2, the spring 33 is compressed by pressure generated in the pilot pressure receiving chamber 31y to cause the pressure control valve to be displaced in the leftward direction, thereby communicating the input port 11 with the output port 13 and interrupting the communication between the output port 13 and the drain port 17. As the result, the hydraulic fluid is introduced into the clutch or brake, so that the clutch or brake will be switched to the acting state.

Next, the pressure proportional valve 50 will be explained.

The pressure proportional valve 50 has a valve seat body 50x screwed to a connecting section 41 of the proportional solenoid 40 by screws, and a valve element 55. The valve seat body 50x comprises a section facing the pilot pressure receiving chamber 31y in the housing 3, a female screw section 41 screwed to the connecting section 41 of the proportional solenoid 40, axial drain passages 51c and 51b and a radial drain passage 51a through which the hydraulic fluid in the pilot pressure receiving chamber 31y is drained, a valve element seat surface 51d formed at the position where the axial drain passages 51c and 51b are communicated with the radial drain passage 51a, and a container in which a valve element 55 is removably supported.

The valve element 55 comes in contact with the valve element seat surface 51d, and is so disposed in the container in the valve seat body 50x that the valve element can be displaced between a position where the communication between the axial drain passage 51b and the radial drain passage 51a is interrupted, and a position where it is possible to change the amount of the drain fluid. With such a construction, the valve element 55 can be displaced within a clearance between the valve element seat surface 51d and itself by the flow of the drain fluid and operation of the proportional solenoid 40. A pilot pressure circuit is constructed by the above-mentioned input port 11, the passage 16, the throttle passage 26a, the pilot pressure supply passage 18, the pilot pressure receiving chamber 31y, the axial drain passage 51b, the radial drain passage 51a, the valve element 55, the valve element seat surface 51d and the drain port 17.

Next, the proportional solenoid 40 will be explained.

The proportional solenoid 40 is attached to the inside of the housing by screws from the outside of the housing. The proportional solenoid 40 has a main body 43 and a connecting section 41 protruding from the main body 43. The connecting section 41 is sleeve-shaped and has a flange 41c. On the inner and outer surfaces of the left end section of the connecting section 41, a female screw 41a and a male screw 41b are formed respectively. The female screw 41a screws and supports the pressure proportional valve 50, while the male screw 41b is screwed in a screw bore 3A of the housing 3. With this construction, the proportional solenoid 40 is supported to the housing 3. An O-ring 44 seals between the opening edge of the screw bore 3A and the flange 41c of the connecting section 41.

The proportional solenoid 40 has a shaft 47 at its axis center, which can be displaced in the leftward or rightward directions under excitation of a coil (not shown) in the main body 43. When the shaft 47 is displaced in the leftward direction, the valve element 55, which comes into contact with the tip of the shaft 47, is pressed to the valve element seat surface 51d to close the axial drain passage 51b, so that the valve element 55 cannot be displaced. When the shaft 47 is displaced in the rightward direction, the valve element 55 will be able to be displaced, whereby a clearance is defined between the valve element 55 and the valve element seat surface 51d. Therefore, due to the clearance, the axial drain passage 51b is opened, so that the hydraulic fluid is drained from the pilot pressure receiving chamber 31y. The proportional solenoid 40 is connected to the controller (not shown), which operates to control current applied to the proportional solenoid, that is, a displacement position of the shaft 47 or press force of the valve element 55 is controlled.

Next, the pressure switch 60 provided at the upper side of the inside of the housing 3 will be explained.

At the upper portion of the housing 3, a chamber 21 is formed in which a spool 70 that constructs the pressure switch 60 is disposed. In the housing 3, a pressure detecting passage 23 is formed between the chamber 21 and the output port 13. In addition, the chamber 21 is communicated with the drain port 17.

The spool 70 of the pressure switch 60 is constructed by a left spool 71 and a right spool 73 which are fitted each other with a recess and a protrusion coupling. In the center of the spool 70, a piston 75 is slidably built. In the left spool 71, a hollow part 71a is defined in which a spring 72 is displaced. The right end of the spring 72 comes in contact with the flange 75a of the piston 75 to bias the piston 75 rightward. A spring 74 surrounds the right spool 73 and the left end of the spring 74 comes in contact with a flange 73a of the right spool 73 to bias the right spool 73 leftward.

Figure 10:
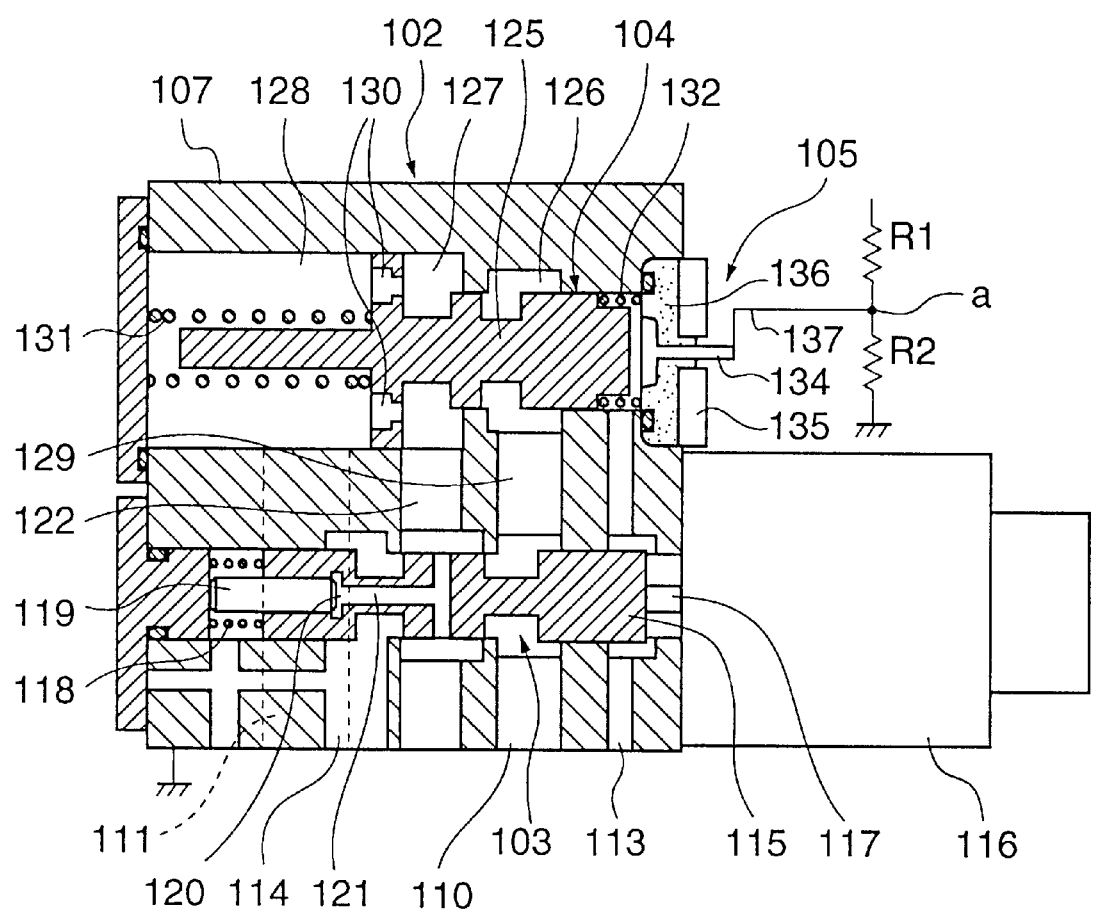
FIG. 10 is a sectional drawing showing a structure of the valve in the apparatus of FIG. 9.

The pressure switch 60 has an attachment 65 and a bellows-shaped cover 62 combining with an isolation sheet 67. The attachment 65 is fixed to the housing 63 by a bolt 68. An O-ring 69 seals between the attachment 65 and the opening edge, of the chamber 21 in the housing 3. On the isolation sheet 67, a switch bar 61 made of metal is supported. The left end of the switch bar 61 does not come in contact with the tip of the piston 75, while the right end of the switch bar 61 is connected to a same detecting circuit as that of the apparatus as described in FIG. 10. As the spool 70 is pressed by the hydraulic pressure in the output port 13, the spring 74 is compressed and displaced in the rightward direction to bring the piston 75 into contact with the switch bar 61. This causes the passage extended from the output port 13 to the inside of the clutch to be filled with the hydraulic fluid, whereby a clutch or brake initial engagement pressure rises. The rising of the pressure will be detected by the detecting circuit. The spring 74 has an intensity such that, when the hydraulic pressure in the passage extending from the output port 13 to the inside of the clutch is greater than the clutch or brake initial engagement pressure, the spring 74 is so compressed that the piston 75 can be displaced in the pressure detecting direction, and, when the pressure is less than the clutch or brake initial engagement pressure, the piston 75 cannot be displaced in the pressure detecting direction. The signal outputted from the detecting circuit is sent to the controller. The switch bar 61 is covered with the bellows-shaped cover 62.

Next, the operation of the hydraulic pressure control apparatus 1 having the above-mentioned construction will be explained referring to FIGS. 1 to 5.

Figure 11A:
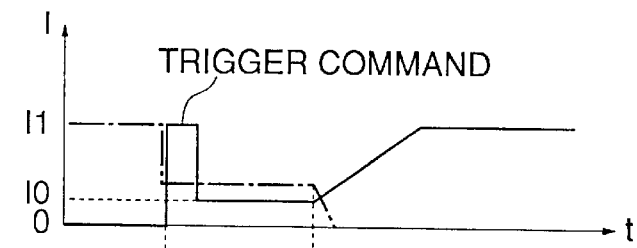
FIG. 11 is a timing chart showing the operation of the apparatus of FIG. 9.
Figure 11B:
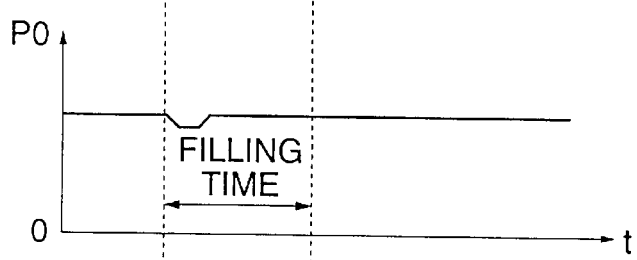
Figure 11C:
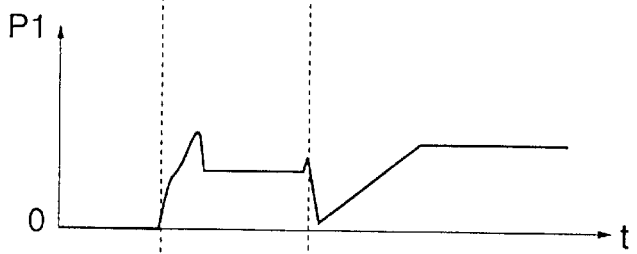
Figure 11D:
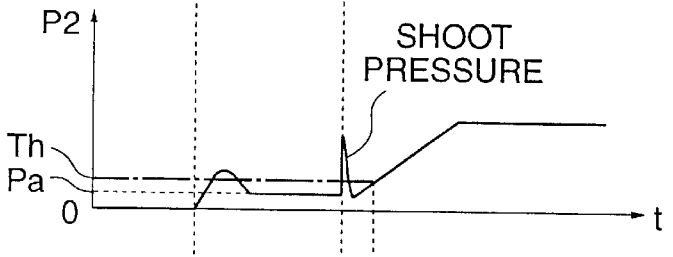
Figure 11E:
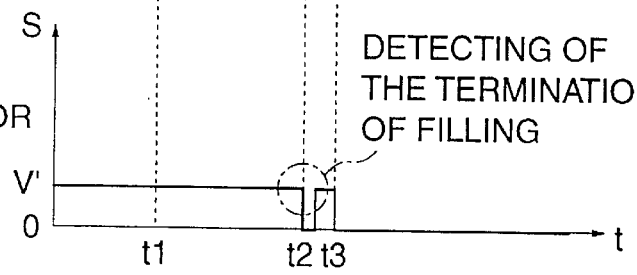

In FIG. 5(A) to FIG. 5(D), the horizontal axis shows a time t. The vertical axis shows a command current I outputted from the controller (that is, press force of the proportional solenoid 40) in FIG. 11(A), pressure PP in the pilot pressure chamber in FIG. 11(B), clutch pressure PK in FIG. 11(C), and a potential V detected by the pressure sensor 60 in FIG. 111(D).

First, at a non engagement state of a clutch or brake, current is not supplied to the proportional solenoid 40. At this time, the shaft 47 is displaced in the rightward direction, so that the valve element 55, which comes in contact with the tip of the shaft 47, is pressed by the pilot fluid in the pilot pressure receiving chamber 31y to be parted away from the valve element seat surface 51d with the result being that a clearance is defined between the valve element seat surface 51d and itself. Therefore, the hydraulic fluid delivered from a pump is introduced from the input port 11 to the drain port 17, via the passage 16, a throttle passage 26a of the screw 26, the pilot pressure supply passage 18, the pilot pressure receiving chamber 19, the axial drain passages 51c and 51b of the pressure proportional valve 50 and the radial drain passage 51a of the pressure proportional valve 50.

At this moment, since the pressure in the pilot pressure receiving chamber 19 becomes substantially equal to that in the drain port 17, the pilot pressure does not rise in the pilot pressure receiving chamber 19. Therefore, the pressure control valve 30 is displaced in the rightward direction under a resilient force of the spring 33 and comes in contact with the valve seat body 50x of the pressure proportional valve 50 thereby being positioned. Since the input port 11 is not communicated with the output port 13 and the output port 13 is communicated with the drain port 15, the hydraulic pressure is not supplied to the clutch cylinder.

In such a state in which the clutch will be connected from the non-engagement state, as shown in FIG. 5(A), at a time point t1, the controller operates to supply a large amount flow-in command current to the proportional solenoid in order to excite the proportional solenoid 40. The excitation is maintained until a time point t2 (for instance, about 0.1 second).

The excitation of the proportional solenoid 40 allows the shaft 47 to be displaced in the leftward direction from the position, as shown in FIG. 1, with a force in proportion to the supplied current, so that the valve element 55, which comes in contact with the tip of the shaft 47, is pressed to the valve element seat surface 51d to close the axial drain passage 51b. Accordingly, the pilot pressure receiving chamber 19 is isolated from the drain port 17 with the result that pilot pressure rises in the pilot pressure receiving chamber 19 as shown in FIG. 5(B). The pilot pressure is proportion to the excitation force, which is produced by supplying the large amount command current to the proportional solenoid 40, and is larger than the resilient force of the spring 33, so that the pressure control valve 30 is displaced in the leftward direction to allow the pilot pressure circuit to enter an opened state as shown in FIG. 2.

As shown in FIG. 2, as the pressure control valve 30 is displaced in the leftward direction, the input port 11 is communicated with the output port 13 and the communication between the output port 13 and the drain port 17 is interrupted. This state is maintained during a period from the time point t1 to the time point t2, at which the pressure control valve 30 is almost fully-opened, so that a large amount of hydraulic fluid flows into the clutch or brake chamber in a short period just before the clutch or brake chamber will be completely filled with the hydraulic fluid. At the period between the time point t1 and the time point t2, the clutch pressure will be larger than the initial engagement hydraulic fluid pressure, as the clutch or brake chamber has been completely filled with the hydraulic fluid, as shown in FIG. 5(C).

At this moment, pressure rises in the pressure detecting passage 23 to cause the spool 70 of the pressure switch 60 to be displaced in the rightward direction overcoming the bias force of the spring 74. Accordingly, the piston 75 is pressed to the switch bar 61, whereby potential detected by the pressure switch 60 becomes zero level.

Next, at the time point t2, as shown in FIG. 5(A), the controller operates to switch the command current I to a filling command small current I2, which is lowered in order to cause the hydraulic fluid to flow into the clutch or brake chamber with a pressure which is controlled so as to exceed the clutch or brake initial engagement hydraulic fluid pressure by a little, and keep this state until the termination of filling. Since the command current is lowered, the excitation force of the proportional solenoid 40, by which the valve element 55 which comes in contact with the tip of the shaft 47, is pressed to the valve element seat surface 51d, is switched to an exciting force in proportion to the lowered current. Therefore, the pilot pressure in the pilot pressure receiving chamber 31y causes the valve element 55, which closes the drain passage, to be displaced with the result that a clearance is defined between the valve element 55 and the valve element seat surface 51d, whereby the pilot fluid in the pilot pressure receiving chamber 31y is drained through the clearance. In the drain of the pilot fluid, the clearance between the valve element 55 and the valve element seat surface 51d is controlled so that the pressure in the pilot pressure receiving chamber 31y will be kept in proportion to the excitation force in response to the above-mentioned filling command small current I2. In addition, the pressure control valve 30 is moved back by the pressure in the feedback pressure receiving chamber 31x in the clutch or brake chamber to be displaced in the rightward direction.

The displacement of the pressure control valve 30 in the rightward direction causes the output port 13 to be communicated with the drain port 15 and the hydraulic fluid in the clutch or brake chamber to be drained, so that the pressure in the feedback pressure receiving chamber 31x is lowered. The lowering of the pressure is maintained until the pressure in the feedback pressure receiving chamber 31x is balanced with the hydraulic fluid pressure in the pilot pressure receiving chamber 31y, which is proportional to the excitation force produced by supplying the above-mentioned filling command current. At this moment, the communication between the output port 13 and the drain port 15 is interrupted and the communication opening between the input port 11 and the output port 13 is throttled, so that the amount of hydraulic fluid which flows into the output port 13 becomes small. As a result, the clutch or brake chamber, which is not yet completely filled, will be completely filled by the supplement of the small amount of hydraulic fluid and the clutch or brake will be engaged without being shocked. The operation is maintained until the clutch or brake chamber will be completely filled with the hydraulic fluid.

During a period in which a small amount of hydraulic fluid flows for the supplement, since the clutch or brake chamber is not filled with the hydraulic fluid, the spring 72 of the pressure switch 60 biases the spool 70 in the leftward direction whereby the pressure switch 60 does not operates. Therefore, the piston 75 is parted from the switch bar 61, whereby potential detected by the pressure switch 60 increases (for instance, 24V), as shown in FIG. 5(D).

Such flowing of a small amount of hydraulic fluid for supplement is maintained until the pressure switch 60 detects that filling of the actuator chamber with the hydraulic fluid has terminated. At this time, since the clutch or brake chamber will be completely filled with the hydraulic fluid and the clutch or brake initial engagement hydraulic fluid pressure rises, the spring 72 of the pressure switch 60 is compressed by the initial pressure to cause the spool 70 to be displaced in the rightward direction, whereby the pressure switch 60 begins to operate.

Here, as shown in FIG. 5(D), the pressure switch 60 detects a first high output pressure (the voltage is 0 level) at the time point t1 (when the valve is opened), a low output pressure (the voltage is 24V) at the time point t2 (when the valve is throttled), and thereafter a second high output pressure (the voltage is 0 level) at the termination of filling (the time point t3). During this period, the controller operates to cancel the first high output pressure and detect the termination of filling by the second high output pressure. The controller, which has received the second detecting signal showing the termination of filling, operates so that the command current I is switched from the filling command small electrical current I2 to a hydraulic fluid pressure gradually-increasing command current for applying a gradually-increasing excitation force to the coil in the proportional solenoid 40, as shown in FIG. 5(A). Here, the second detecting signal at the termination of filling may take as a time guideline that in which the actuator chamber comes to be filled with the hydraulic fluid initially. Accordingly, in a case in which the apparatus according to the present invention is applied to a speed-changing clutch, when a initial filling period is over a predetermined period due to an abrasion of a clutch lining, or, when the inflow amount of the hydraulic fluid, with which a clutch cylinder is filled, is changed by slowness and fastness of the flow speed of the hydraulic fluid related to engine rotational frequency and temperature of the fluid, resulting in the initial filling period being over or below the predetermined period, the apparatus controls the period at which the large amount inflow command is outputted. Accordingly, the inflow amount of the hydraulic fluid can be regulated so that the period, in which the actuator chamber comes to be filled with the hydraulic fluid initially, can be suitably adjusted in order to correct a clutch engagement period.

The gradually-increasing excitation of the proportional solenoid 40 causes the shaft 47 to be gradually displaced in the leftward direction in FIG. 1, with the result that the clearance between the valve element 55, which comes in contact with the tip of the shaft 47, and the valve element seat surface 51*d* is gradually narrowed against the flow of the pilot fluid. Thus, since the amount of hydraulic fluid decreases, which escapes from the pilot pressure receiving chamber 19 to the drain port 17 via the axial drain passages 51*c* and 51*d* and the radial drain passage 51*a*, the hydraulic fluid pressure in the pilot pressure receiving chamber 19 will increase in proportion to the gradually-increasing current applied to the proportional solenoid 40, as shown in FIG. 5(B).

As a result, the hydraulic fluid pressure in the pilot pressure receiving chamber 19 will gradually increase, by which the communication between the output port 13 and the drain port 17 keeps from being interrupted. Therefore, the controller operates to adjust the gradual-increasing of the clutch or brake engagement hydraulic fluid pressure so that the communication between the input port 11 and the output port 13 is maintained to cause the hydraulic fluid to flow into the clutch chamber in order to increase the pressure in the feedback pressure receiving chamber 31*x* in balance with the gradually-increasing pressure produced in the pilot pressure receiving chamber 19.

The gradually-increasing control of the clutch or brake engagement hydraulic fluid pressure is carried out as follows. First, the controller operates to output a gradually-increasing command current to the proportional solenoid 40 for a predetermined period, so that the clutch or brake engagement hydraulic fluid pressure will be increased to the set pressure for the predetermined period. After the predetermined period, the controller operates to switch the gradually-increasing command current to a clutch or brake engagement pressure set command current, so that the pressure in the pilot pressure receiving chamber 19 is kept constant. When the pressure in the clutch or brake feedback chamber 14 exceeds the pressure in the pilot pressure receiving chamber 19, the communication between the output port 13 and the drain port 15 or the input port 11 of the pressure control valve 30, respectively, is intermittently interrupted, so that the pressure in the clutch or brake feedback chamber 14 will be balanced with the pressure in the pilot pressure receiving chamber 19 in order to keep the clutch or brake engagement set pressure constant. Incidentally, the predetermined gradually-increasing period, from a time point when the second filling signal is detected by the pressure switch 60 to a time point when the pressure in the pilot pressure receiving chamber 19 reaches the clutch or brake engagement set pressure, will be controlled so that a period until an engagement of a clutch or brake will be variable, by shortening or extending the engagement period or changing the gradually-increasing current in the predetermined period in which the gradually-increasing current command is outputted, in response to the clutch or brake engagement condition (for instance, when a vehicle runs on an upgrade, a downgrade, or level ground).

The valve apparatus for controlling hydraulic pressure having the above-mentioned structure will have effects as described in the following. In the conventional apparatus, when a clutch cylinder is completely filled with a hydraulic fluid, a difference in the pressure receiving areas of the front and back of a throttle causes a flow rate detecting valve to be displaced and come in contact with a filling detecting probe. In this case, since the detecting probe is displaced after the termination of filling, the response time in the apparatus is so bad that shoot pressure may be generated, which causes an engagement shock of the clutch. However, in the apparatus according to the present invention, the detecting probe is constructed such that, when a clutch or brake cylinder is completely filled with a hydraulic fluid and a clutch or brake initial engagement pressure rises, detection will be carried out, and, during a period in which the cylinder is being filled with the hydraulic fluid under the initial pressure, detection will not be carried out. Accordingly, it is possible to have good response and to prevent the occurrence of the shoot pressure in comparison with the conventional method where displacement is detected by the difference in the pressure receiving areas.

Furthermore, since the pressure control valve is controlled to be displaced by the pilot pressure, displacing force and displacement stroke will be improved in comparison with the conventional displacement control by magnetic force of the proportional solenoid. Accordingly, occurrence of displacement stick is prevented and a large amount of hydraulic fluid can flow, and it is not necessary to use the proportional solenoid having a large exciting force, whereby it is possible to reduce costs.

{The Second Embodiment}

Referring FIG. 6 and FIG. 7, a second embodiment according to the present invention will be explained.

Figure 6:
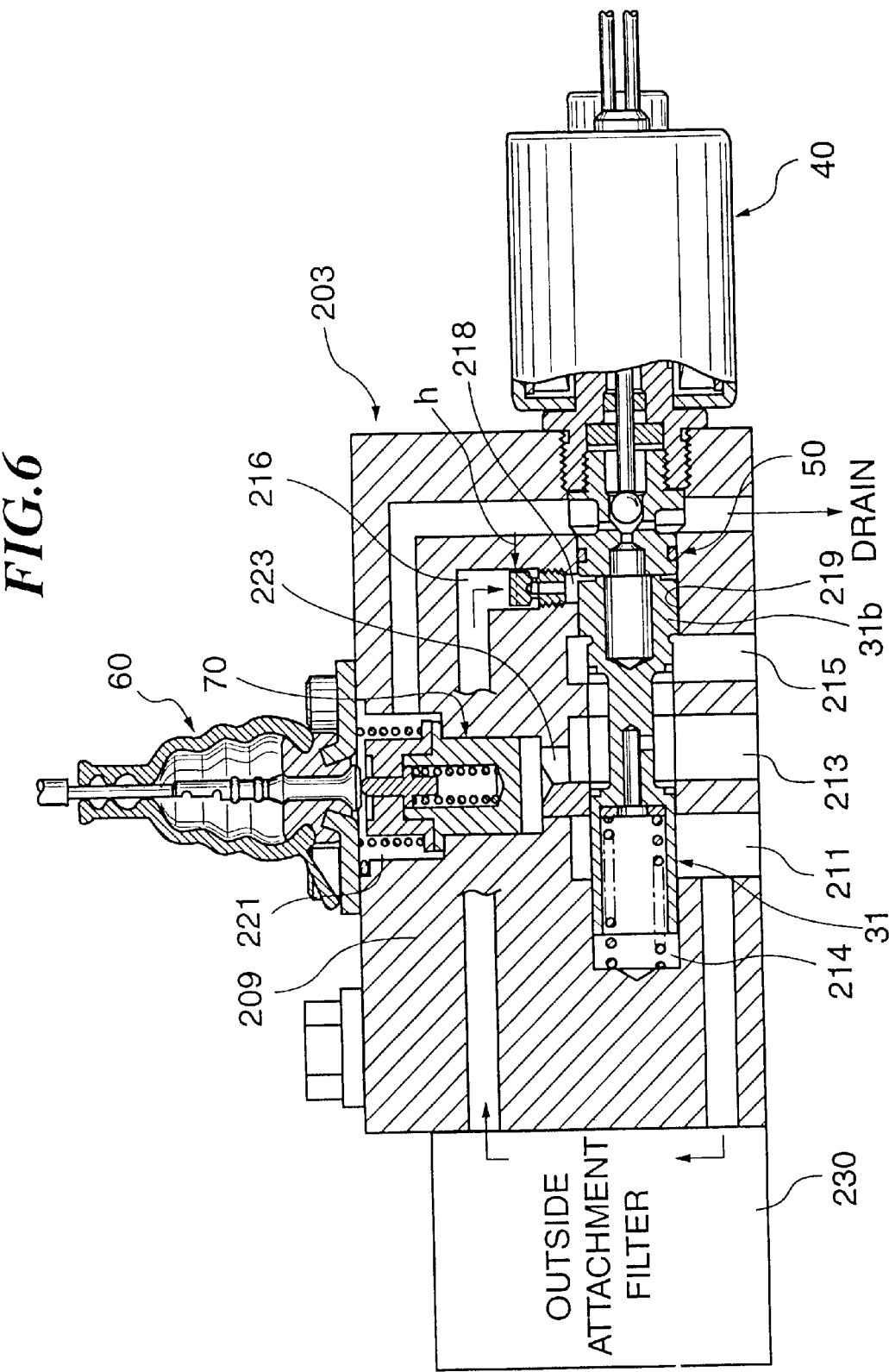
FIG. 6 is a sectional drawing showing a clutch hydraulic pressure control apparatus according to the second embodiment of the present invention.
Figure 7:
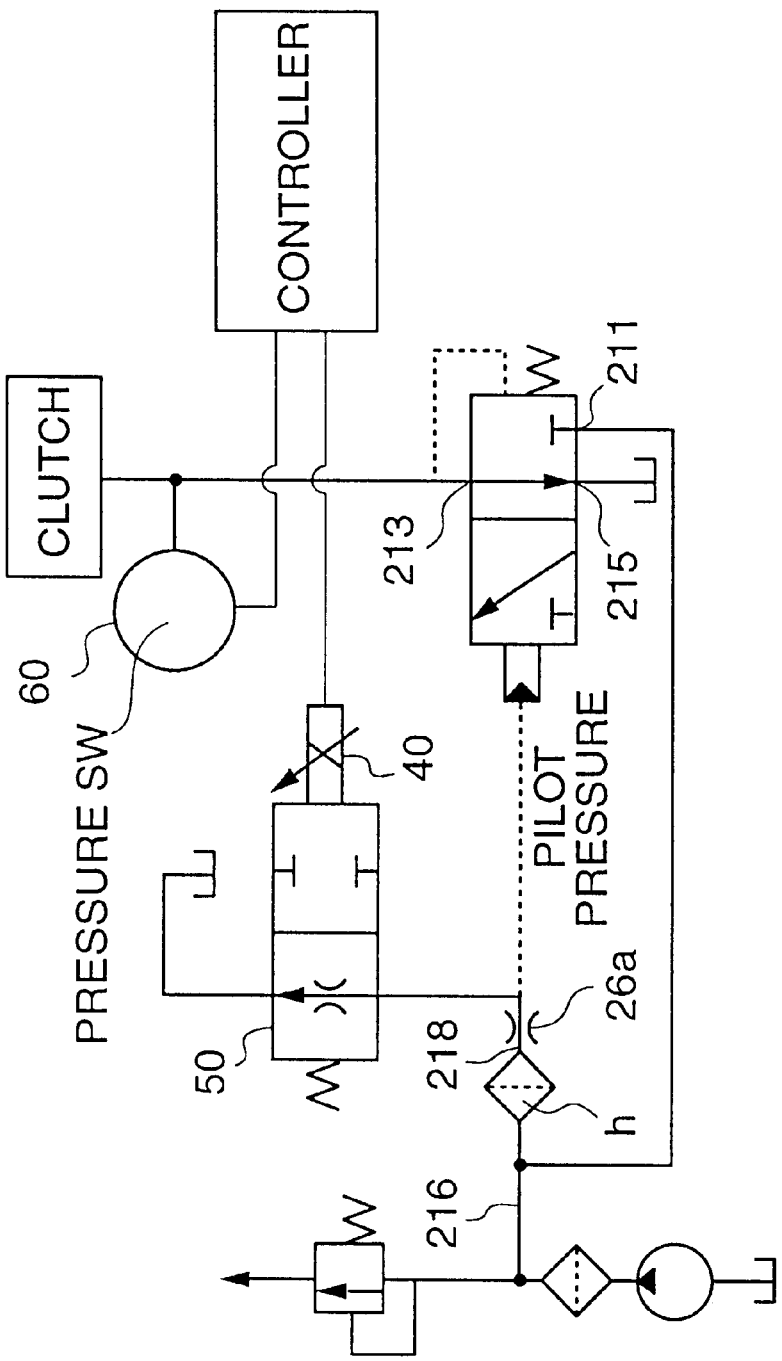
FIG. 7 is a circuit diagram showing a clutch hydraulic pressure control apparatus according to an embodiment of the present invention.

In a clutch hydraulic pressure control apparatus 201, as shown in FIG. 6, a main difference from that of the first embodiment as shown in FIG. 1 to FIG. 3, is the structure of the housing thereof. A pressure control valve 30, a pressure proportional valve 50, a proportional solenoid 40 and a pressure switch 60 have similar structure and function as those of the first embodiment, respectively.

As shown in FIG. 6, in a housing 203 of the clutch hydraulic pressure control apparatus 201 according to the second embodiment, an input port 211 communicated with a pump, an output port 213 communicated with a clutch cylinder, and drain ports 215 and 217 communicated with a tank, respectively, are provided. A main passage from the pump to the cylinder is constituted by the input port 211 and the output port 213.

In the housing 203, at the right of the drain port 215, a pilot pressure receiving chamber 219 is defined in which a right end section 31b of the pressure control valve 30 is slidably disposed. To the upper side of the pilot pressure receiving chamber 219 is communicated a pilot pressure supply passage 218, which is communicated with an output passage of the pump via a filter h and a throttle 216.

An outside attached filter 230 in FIG. 6 acts as a pilot fluid filter when a pilot fluid is delivered from the input port 211 of the pump and flowed into the apparatus. The outside attached filter 230 is disposed outside the housing 203 so that it is easy to carry out maintenance. The filter h in FIG. 7 acts as a filter which prevents the throttle 26a from being blocked as in the first embodiment.

At the upper side of the housing 203, a chamber 221 is defined in which the spool 70 that constructs the pressure switch 60 is disposed. In the housing 203, a pressure detecting passage 223 is defined between the chamber 221 and the output port 213. The chamber 221 is also communicated with the drain port 217.

In the clutch hydraulic pressure control apparatus 201 of the second embodiment, the peak pressure (the shoot pressure) at the termination of filling, which usually occurs in the conventional apparatus, does not occur, because it is controlled in the same manner as the clutch hydraulic pressure control apparatus 1 in the first embodiment. Accordingly, a speed-changing shock in a clutch will not be generated, so that smooth switching can be accomplished. Since the outside attachment filter 230 is positioned outside the housing 203 in the clutch hydraulic pressure control apparatus 201, it is especially easy to carry out maintenance.

{The Third Embodiment}

Figure 8:
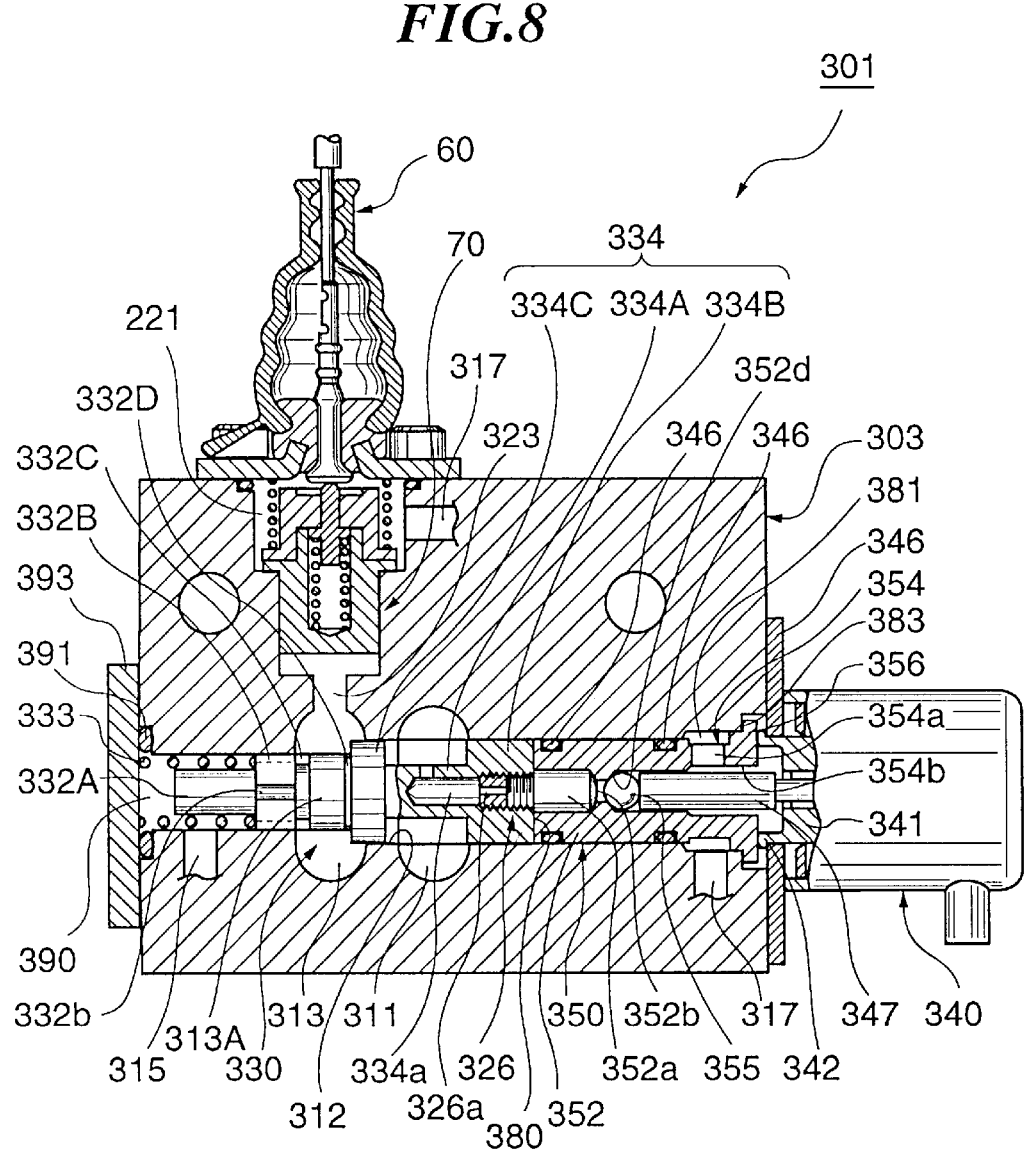
FIG. 8 is a sectional drawing showing a clutch hydraulic pressure control apparatus according to the third embodiment of the present invention.

Referring FIG. 8, a third embodiment according to the present invention will be explained.

The main feature of a clutch hydraulic pressure control apparatus in the third embodiment is that a pilot pressure supply passage is defined in a pressure control valve. The clutch hydraulic pressure control apparatus 301 as shown in FIG. 8, has a housing 303, in which are provided an input port 311 communicated with a pump, an output port 313 communicated with a clutch cylinder and a drain port 315 communicated with a tank. A pressure control valve 330, a pressure proportional valve 350 and a proportional solenoid 340 are aligned in an axial line from inside to outside of the housing 3.

First, the pressure control valve 330 will be explained. The pressure control valve 330 has a land section 334C, which separates the input port 311 from the output port 313 and slides in the left and right directions to be selectively communicated between the input port 311 and the output port, a land section 313A, which separates the output port 313 from the drain port 315 and slides in the left and right directions to be selectively communicated between the output port 313 and the drain port 315, a land section 334B, which interrupts the communication with the input port 311, and the end surface of which acts as a pressure receiving surface 380 for the pilot fluid, and a land section 332B which receives a resilient force of a spring 333.

In addition, the diameter of the land section 334C is larger than that of the land section 313A so that a circular pressure receiving surface 332D is defined, which acts as a feedback pressure receiving surface for clutch or brake engagement pressure. Additionally, at a small diameter section defined between the land section 323 and the land section 334B, a radial passage is formed. Further, an inside axial passage 334a is formed, which has a throttle passing passage 326a that communicates with the radial passage and reaches the end surface 380 of the land section 334B. With this construction, a pilot fluid can load on the end surface of the pressure control valve 330.

The diameter of the land section 313A is equal to that of the land section 332B, and a circular groove 332C is formed between the land sections 313A and 332B. In addition, an axial passage 332b is formed at the outer surface of the land section 332B, with the result that the circular groove 332C is communicated with the axial passage 332b, which acts as a drain passage communicating between the input port 313 and the output port 315.

Next, the pressure proportional valve 350 will be explained.

The pressure proportional valve 350 has a cylindrical valve seat body 352, which is aligned and close to the pressure control valve 330. In the cylindrical valve seat body 352, a pilot fluid chamber 352a, a throttle drain 352b in the pilot fluid chamber 352a, a trombone-shaped valve seat 352d and a pilot fluid drain 354 in the pilot fluid chamber 352a are aligned on the axis thereof. The pilot fluid chamber 352b faces an inner axial passage 334a opened to the pilot fluid pressure receiving end surface 380 of the pressure control valve 330. The force of the valve element 355, which is pressed against the trombone shaped valve seat 352d by the shaft 347 of the proportional solenoid 340, is so adjusted that the flow amount of the drain fluid from the throttle drain 352b can be controlled.

A drain section 354 is located in a drain chamber 381 in the housing 303. In the drain section 354, a drain fluid passage 354a communicated with the inside of the drain chamber 381 is formed. At the right end of the drain section 354, an engagement flange section 356 is formed, which is engaged with a stepped section formed between the drain chamber 381 and a spot facing 383. At the axis center of the drain section 354, a center hole 354b is formed.

Next, the proportional solenoid 340 will be explained.

The proportional solenoid 340 has the almost same structure as the proportional solenoid 40 in the above-mentioned first and second embodiments. However, the structure of the connecting section is slightly different.

The proportional solenoid 340 has a connecting section 341, which is sleeve shaped. At the left end of the connecting section 341, a circular bias section 342 is formed. On the outside of the connecting section 341, an attachment plate 346 is provided. The proportional solenoid 340 is fixed to the attachment plate 346 provided at the right end surface of the housing 303. In the fixed state, the bias section 342 of the connecting section 341 comes in contact with the right end surface of the engagement flange section 356 of the pressure proportional valve 350. Therefore, the pressure proportional valve 350 is fixed to the inside of the housing 303. Incidentally, the shaft 347 of the proportional solenoid 340 has the almost same structure as that of the proportional solenoid 40 in the above-mentioned first and second embodiments.

At the upper portion of the housing 303, a chamber 221 is formed, in which a spool 70 that constructs the pressure switch 60 is disposed. In the housing 303, a pressure detecting passage 323 is formed between the chamber 221 and the output port 313. The chamber 221 is communicated with the drain port 315.

In the clutch hydraulic pressure control apparatus 301 in the third embodiment, in the closed state, the shaft 347 of the proportional solenoid 340 is displaced in the rightward direction so that a clearance is defined between the valve element 355 which comes in contact with the tip of the shaft 347, and the valve element seat surface 352d of the valve seat body 350. At this time, the hydraulic fluid delivered from a pump is introduced from the input port 313, and flows to the hydraulic fluid passage 334a formed at the large diameter section 334 of the pressure control valve 330 (containing the hydraulic fluid passage 326a formed at the orifice section 326), to the hydraulic fluid passage 352a formed at the valve seat body 350 (containing the throttle passage 352b) to the drain fluid passage 354a and finally to the drain port 317. At this moment, since the pilot pressure will not rise between the pressure control valve 330 and the valve seat body 350 (the right chamber 380, that is, a pilot pressure receiving chamber), the pressure control valve 330 is displaced in the rightward direction under the bias force of the spring 333 and comes in contact with the valve seat body 350. Accordingly, as shown in FIG. 8, the communication between the input port 311 and the output port 313 is interrupted by the left large diameter section 334C, and the output port 313 is communicated with the drain port 315, so that hydraulic pressure is not applied to the clutch cylinder.

When the clutch is connected, the proportional solenoid 340 is excited so as to displace the shaft 347 in the left direction, so that the valve element 355 is pressed onto the valve element seat surface 352d and closes the throttle passage 352b. Consequently, the hydraulic fluid delivered from the pump is introduced from the input port 311, and flows to the hydraulic fluid passage 334a formed at the large diameter section 334 of the pressure control valve 330 (containing the hydraulic fluid passage 326a formed at the orifice section 326), and to the hydraulic fluid passage 352a of the valve seat body 350 (containing the throttle passage 352b). As the result, pressure rises in the right chamber 380 located between the pressure control valve 330 and the valve seat body 350. When the pilot pressure is larger than the bias force of the spring 333, the pressure control valve 330 is displaced in the leftward direction.

As the pressure control valve 330 is displaced in the leftward direction, the left large diameter section 334C of the pressure control valve 301 is positioned in the output port 313, with the result being that the communication passage 312 is opened, whereby the input port 311 is communicated with the output port 313. Therefore, the hydraulic fluid is introduced into the clutch cylinder to cause the clutch pressure to be increased. Next, as the command current supplied to the proportional solenoid 340 is decreased, the shaft 347 is slightly displaced in the rightward direction, whereby the press force to the valve element seat surface 352d of the valve element 355 weakens. Consequently, the hydraulic fluid delivered from the input port 311 is introduced from the hydraulic fluid passage 334a formed at the large diameter section 334 of the pressure control valve 330 (containing the hydraulic fluid passage 326a formed at the orifice section 326) and flows to the hydraulic fluid passage 352a formed at the valve seat body 350 (containing the throttle passage 352b), to the drain fluid passage 354a, and finally to the drain port 317. As the result, the pressure control valve 330 is displaced in the rightward direction, so that the opening of the communication passage 312 decreases, whereby the amount of hydraulic fluid introduced from the input port 11 to the output port 13 becomes small.

As described above, in the third embodiment, the flowing direction of the hydraulic fluid is different from that of the above-mentioned first and second embodiments. However, since control of the hydraulic fluid is carried out in the same manner as the above-mentioned manner, pressure regulation and modulation will be carried out in the same manner. Accordingly, in the third embodiment, the peak pressure (the shoot pressure) at the termination of filling, which occurs conventionally, is not generated.

Since the orifice section 326 is provided in the hydraulic fluid passage 334a in the pressure control valve 301, the housing 303 has become especially compact in the third embodiment. Accordingly, the apparatus can be installed in a small space.

EFFECTS OF THE INVENTION

As mentioned above, the present invention has following effects.

(1) The peak pressure (the shoot pressure) is not generated, which occurs at the termination of filling in the conventional apparatus. Further, it is possible to reduce costs.

(2) A large amount of hydraulic fluid can flow.

(3) Even if the proportional solenoid has a small capacity, mis-operation due to biting of particles hardly occurs. In addition, because the solenoid may have a small thrust, it is possible to reduce costs.

(4) In a case in which a filter is disposed upstream of a throttle, the filter can prevent the throttle passage from being blocked.

(5) In a case in which a filter is disposed outside the casing, replacement and cleaning of the filter can be easily carried out.

We claim:

1. A valve apparatus for controlling hydraulic pressure for a clutch or brake, said valve apparatus comprising:

a pressure control valve having an output port, said pressure control valve also having a clutch or brake cylinder inner pressure feedback chamber at one end thereof and a pilot pressure receiving chamber at another end thereof, said pressure control valve being adapted to introduce clutch or brake engagement pressure hydraulic fluid, which is to flow into a clutch or brake cylinder hydraulic chamber, into said clutch or brake cylinder inner pressure feedback chamber, and being operable to increase a hydraulic fluid pressure of the clutch or brake engagement pressure hydraulic fluid to balance with a magnitude of pilot pressure generated in said pilot pressure receiving chamber such that said pressure control valve controls a clutch or brake cylinder pressure;

a pilot fluid passage having a throttle, said pilot fluid passage adapted to allow the clutch or brake engagement pressure hydraulic fluid to flow as pilot fluid to said pilot pressure receiving chamber of said pressure control valve;

a pressure proportional valve having a valve element, said pressure proportional valve being operable to control a pressure of the pilot fluid that flows into said pilot pressure receiving chamber by positioning said valve element at one of a drain interruption position, a throttle position, and a drain release position;

a proportional solenoid being operable to change a position of said valve element of said pressure proportional valve against the flow of the pilot fluid, and control a magnitude of the pressure of the pilot fluid; and a pressure switch communicating with said output port of said pressure control valve, said pressure switch being operable to detect a clutch or brake initial engagement hydraulic fluid pressure when the clutch or brake cylinder hydraulic chamber is being filled with the clutch or brake engagement pressure hydraulic fluid.

2. A valve apparatus according to claim 1, further comprising a filter provided upstream of said throttle and mounted at said pilot fluid passage.

3. A valve apparatus according to claim 2, further comprising a second filter provided outside of a casing and upstream of said filter.

4. A valve according to claim 1, wherein said pressure switch operates when the clutch or brake initial engagement hydraulic fluid pressure is reached in the clutch or brake cylinder hydraulic chamber due to the filling of the clutch or brake engagement hydraulic fluid, and said pressure switch does not operate when a pressure in the clutch or brake cylinder hydraulic chamber is less than the clutch or brake initial engagement hydraulic fluid pressure.

5. A valve apparatus according to claim 4, further comprising a filter provided upstream of said throttle and mounted at said pilot fluid passage.

6. A method for controlling hydraulic pressure a hydraulic fluid control valve employing a valve apparatus comprising a pressure control valve having an output port, the pressure control valve also having a clutch or brake cylinder inner pressure feedback chamber at one end thereof and a pilot pressure receiving chamber at another end thereof, the pressure control valve being adapted to introduce clutch or brake engagement pressure hydraulic fluid, which is to flow into a clutch or brake cylinder hydraulic chamber, into the clutch or brake cylinder inner pressure feedback chamber, and being operable to increase a hydraulic fluid pressure of the clutch or brake engagement pressure hydraulic fluid to balance with a magnitude of pilot pressure generated in the pilot pressure receiving chamber such that the pressure control valve controls a clutch or brake cylinder pressure, a pilot fluid passage having a throttle, the pilot fluid passage adapted to allow the clutch or brake engagement pressure hydraulic fluid to flow as pilot fluid to the pilot pressure receiving chamber of the pressure control valve, a pressure proportional valve having a valve element, the pressure proportional valve being operable to control a pressure of the pilot fluid that flows into the pilot pressure receiving chamber by positioning the valve element at one of a drain interruption position, a throttle position, and a drain release position, a proportional solenoid being operable to change a position of the valve element of the pressure proportional valve against the flow of the pilot fluid, and control a magnitude of the pressure of the pilot fluid, and a pressure switch communicating with the output port of the pressure control valve, the pressure switch being operable to detect a clutch or brake initial engagement hydraulic fluid pressure when the clutch or brake cylinder hydraulic chamber is being filled with the clutch or brake engagement pressure hydraulic fluid, the valve apparatus being connected to a controller, said method comprising:

flowing a large amount of the clutch or brake engagement pressure hydraulic fluid into the clutch or brake cylinder hydraulic fluid chamber until just before the clutch or brake cylinder hydraulic fluid chamber is filled, said flowing of the large amount of the clutch or brake engagement pressure hydraulic fluid comprising interrupting a draining of the pilot fluid from the pressure proportional valve to a tank and increasing the pressure of the pilot fluid in the pilot pressure receiving chamber to a high level by outputting a large amount inflow command current from the controller to the proportional solenoid of the hydraulic fluid pressure control valve for a first predetermined period in response to a clutch or brake engagement start command, whereby a communicating port between an input port and the output port of the pressure control valve is opened and becomes large;

flowing a small amount of the clutch or brake engagement pressure hydraulic fluid into the clutch or brake cylinder hydraulic fluid chamber until the clutch or brake cylinder hydraulic fluid chamber is filled, said flowing of the small amount of the clutch or brake engagement pressure hydraulic fluid comprising draining the pilot fluid from the pressure proportional valve to the tank through another throttle, thereby lowering the pressure of the pilot fluid in the pilot pressure receiving chamber by outputting a small amount inflow command current from the controller to the proportional solenoid of the hydraulic fluid pressure control valve after the first predetermined period in which the large amount inflow command has been outputted, whereby the communicating port between the input port and the output port of the pressure control valve becomes small;

detecting a termination of filling of the clutch or brake cylinder hydraulic chamber, said detecting of the termination of filling of the clutch or brake cylinder hydraulic chamber comprising detecting a rise of the clutch or brake initial engagement pressure with the pressure sensor provided at the hydraulic fluid pressure control valve when the clutch or brake cylinder hydraulic fluid chamber has been filled with the clutch or brake engagement pressure hydraulic fluid, and outputting the detected rise to the controller;

gradually increasing the clutch or brake initial engagement hydraulic fluid pressure, said gradually increasing of the clutch or brake initial engagement hydraulic fluid pressure comprising causing the clutch or brake initial engagement hydraulic fluid pressure to reach a set pressure for a second predetermined period, causing the pressure of the pilot fluid in the pilot pressure chamber to be gradually increased, and causing a pressure in the clutch or brake cylinder inner pressure feedback chamber of the pressure control valve to be increased to balance with the pressure of the pilot fluid which is gradually increased by stopping the output of the small amount inflow command current of the controller to the proportional solenoid of the hydraulic pressure control valve, and supplying a gradually-increasing command current from the controller to the proportional solenoid for the second predetermined period, whereby the opening size of the other throttle, through which the pilot fluid is drained from the pressure proportional valve to the tank, is gradually decreased; and maintaining the clutch or brake initial engagement hydraulic fluid pressure at the set pressure as a clutch or brake engagement set pressure by stopping the output of the hydraulic fluid pressure gradually-increasing command current from the controller after the second predetermined period in which the clutch or brake initial engagement hydraulic fluid pressure has been increased and outputting a set pressure command signal from the controller to the proportional solenoid of the hydraulic fluid pressure control valve.

7. A method for controlling hydraulic pressure a hydraulic fluid control valve employing a valve apparatus comprising a pressure control valve having an output port, the pressure control valve also having a clutch or brake cylinder inner pressure feedback chamber at one end thereof and a pilot pressure receiving chamber at another end thereof, the pressure control valve being adapted to introduce clutch or brake engagement pressure hydraulic fluid, which is to flow into a clutch or brake cylinder hydraulic chamber, into the clutch or brake cylinder inner pressure feedback chamber, and being operable to increase a hydraulic fluid pressure of the clutch or brake engagement pressure hydraulic fluid to balance with a magnitude of pilot pressure generated in the pilot pressure receiving chamber such that the pressure control valve controls a clutch or brake cylinder pressure, a pilot fluid passage having a throttle, the pilot fluid passage adapted to allow the clutch or brake engagement pressure hydraulic fluid to flow as pilot fluid to the pilot pressure receiving chamber of the pressure control valve, a pressure proportional valve having a valve element, the pressure proportional valve being operable to control a pressure of the pilot fluid that flows into the pilot pressure receiving chamber by positioning the valve element at one of a drain interruption position, a throttle position, and a drain release position, a proportional solenoid being operable to change a position of the valve element of the pressure proportional valve against the flow of the pilot fluid, and control a magnitude of the pressure of the pilot fluid, and a pressure switch communicating with the output port of the pressure control valve, the pressure switch being operable to detect a clutch or brake initial engagement hydraulic fluid pressure when the clutch or brake cylinder hydraulic chamber is being filled with the clutch or brake engagement pressure hydraulic fluid, wherein the pressure switch operates when the clutch or brake initial engagement hydraulic fluid pressure is reached in the clutch or brake cylinder hydraulic chamber due to the filling of the clutch or brake engagement hydraulic fluid, and the pressure switch does not operate when a pressure in the clutch or brake cylinder hydraulic chamber is less than the clutch or brake initial engagement hydraulic fluid pressure, the valve apparatus being connected to a controller, said method comprising:

flowing a large amount of the clutch or brake engagement pressure hydraulic fluid into the clutch or brake cylinder hydraulic fluid chamber until just before the clutch or brake cylinder hydraulic fluid chamber is filled, said flowing of the large amount of the clutch or brake engagement pressure hydraulic fluid comprising interrupting a draining of the pilot fluid from the pressure proportional valve to a tank and increasing the pressure of the pilot fluid in the pilot pressure receiving chamber to a high level by outputting a large amount inflow command current from the controller to the proportional solenoid of the hydraulic fluid pressure control valve for a first predetermined period in response to a clutch or brake engagement start command, whereby a communicating port between an input port and the output port of the pressure control valve is opened and becomes large;

flowing a small amount of the clutch or brake engagement pressure hydraulic fluid into the clutch or brake cylinder hydraulic fluid chamber until the clutch or brake cylinder hydraulic fluid chamber is filled, said flowing of the small amount of the clutch or brake engagement pressure hydraulic fluid comprising draining the pilot fluid from the pressure proportional valve to the tank through another throttle, thereby lowering the pressure of the pilot fluid in the pilot pressure receiving chamber by outputting a small amount inflow command current from the controller to the proportional solenoid of the hydraulic fluid pressure control valve after the first predetermined period in which the large amount inflow command has been outputted, whereby the communicating port between the input port and the output port of the pressure control valve becomes small;

detecting a termination of filling of the clutch or brake cylinder hydraulic chamber, said detecting of the termination of filling of the clutch or brake cylinder hydraulic chamber comprising detecting a rise of the clutch or brake initial engagement pressure with the pressure sensor provided at the hydraulic fluid pressure control valve when the clutch or brake cylinder hydraulic fluid chamber has been filled with the clutch or brake engagement pressure hydraulic fluid, and outputting the detected rise to the controller;

gradually increasing the clutch or brake initial engagement hydraulic fluid pressure, said gradually increasing of the clutch or brake initial engagement hydraulic fluid pressure comprising causing the clutch or brake initial engagement hydraulic fluid pressure to reach a set pressure for a second predetermined period, causing the pressure of the pilot fluid in the pilot pressure chamber to be gradually increased, and causing a pressure in the clutch or brake cylinder inner pressure feedback chamber of the pressure control valve to be increased to balance with the pressure of the pilot fluid which is gradually increased by stopping the output of the small amount inflow command current of the controller to the proportional solenoid of the hydraulic pressure control valve, and supplying a gradually-increasing command current from the controller to the proportional solenoid for the second predetermined period, whereby the opening size of the other throttle, through which the pilot fluid is drained from the pressure proportional valve to the tank, is gradually decreased; and maintaining the clutch or brake initial engagement hydraulic fluid pressure at the set pressure as a clutch or brake engagement set pressure by stopping the output of the hydraulic fluid pressure gradually-increasing command current from the controller after the second predetermined period in which the clutch or brake initial engagement hydraulic fluid pressure has been increased and outputting a set pressure command signal from the controller to the proportional solenoid of the hydraulic fluid pressure control valve.

* * * * *